United States Patent [19]
Beeghly et al.

[11] Patent Number: 5,350,258
[45] Date of Patent: * Sep. 27, 1994

[54] CERAMIC CUTTING TOOL WITH CHIP CONTROL

[75] Inventors: Craig W. Beeghly, Raleigh, N.C.; Deepak P. Ahuja; Pankaj K. Mehrotra, both of Greensburg, Pa.; Kenneth L. Niebauer, Raleigh, N.C.

[73] Assignee: Kennametal Inc., Latrobe, Pa.

[*] Notice: The portion of the term of this patent subsequent to Aug. 25, 2009 has been disclaimed.

[21] Appl. No.: 897,226

[22] Filed: Jun. 11, 1992

Related U.S. Application Data

[63] Continuation-in-part of Ser. No. 629,760, Dec. 18, 1990, Pat. No. 5,141,367.

[51] Int. Cl.$^5$ .............................................. B23B 27/16
[52] U.S. Cl. ................................. 407/119; 407/114; 407/116
[58] Field of Search ....................... 407/114, 116, 119

[56] References Cited

U.S. PATENT DOCUMENTS

| | | | |
|---|---|---|---|
| D. 304,949 | 12/1989 | Niebauer | D15/139 |
| D. 305,239 | 12/1989 | Niebauer | D15/139 |
| D. 305,662 | 1/1990 | Niebauer | D15/139 |
| D. 305,663 | 1/1990 | Niebauer | D15/139 |
| D. 307,149 | 4/1990 | Niebauer | D15/139 |
| D. 308,387 | 6/1990 | Valerius | D15/130 |
| D. 308,975 | 7/1990 | Niebauer | D15/130 |
| D. 311,010 | 10/1990 | Niebauer | D15/139 |
| 3,383,748 | 5/1968 | Galimberti et al. | 29/95 |
| 4,056,871 | 11/1977 | Bator | 407/114 |
| 4,087,193 | 5/1978 | Mundy | 407/114 |
| 4,247,232 | 1/1981 | McCreery et al. | 407/114 |
| 4,259,033 | 3/1981 | McCreery et al. | 407/114 |
| 4,286,905 | 9/1981 | Samanta | 409/132 |
| 4,318,645 | 3/1982 | McCreery | 407/114 |
| 4,323,325 | 4/1982 | Samanta et al. | 409/131 |
| 4,331,048 | 5/1982 | Dworak et al. | 82/1 C |
| 4,340,324 | 7/1982 | McCreery | 407/114 |
| 4,480,950 | 10/1984 | Kraft et al. | 407/103 |
| 4,539,875 | 9/1985 | Lee et al. | 82/1 C |
| 4,616,963 | 10/1986 | Habert et al. | 407/114 |
| 4,627,317 | 12/1986 | Komanduri et al. | 82/1 C |
| 4,685,844 | 8/1987 | McCreery et al. | 407/114 |
| 4,801,510 | 1/1989 | Mehrotra et al. | 428/698 |
| 4,854,784 | 8/1989 | Murray et al. | 407/114 |
| 4,920,838 | 5/1990 | Brandt et al. | 82/1.11 |
| 4,959,331 | 9/1990 | Mehrotra et al. | 511/89 |
| 4,959,332 | 9/1990 | Mehrotra et al. | 511/89 |
| 4,963,060 | 10/1990 | Niebauer et al. | 407/114 |
| 4,963,061 | 10/1990 | Katbi et al. | 407/114 |
| 5,141,367 | 8/1992 | Beeghly et al. | 407/119 |
| 5,147,159 | 9/1992 | Lowe et al. | 407/114 |
| 5,203,649 | 4/1993 | Katbi et al. | 407/114 |
| 5,238,334 | 8/1993 | Brandt et al. | 407/116 |
| 5,264,297 | 11/1993 | Jindal et al. | 428/698 |

FOREIGN PATENT DOCUMENTS 0194811 9/1986 European Pat. Off. .

OTHER PUBLICATIONS

1st International Conference on the Behavior of Materials in Machining, The Institute of Metal, Nov. 1988, pp. 35.1–35.11.
Wolf, A. M., Metal Cutting, wnd edition, revised and amplified (Leningrad: Machinostroyenie, Leningrad Division, 1973), pp. 50–53.
Kennametal Tooling Applications Program–Turning Applications Workbook (1990) pp. 1–84.
"A Practical Guide to Carbide," PL Technical Series, Sidney, Ohio (1981), pp. 28–33.
Schneider, "Principles of Tungsten Carbide Engineering," 2nd Edition (Nov. 17, 1989) p. 4–2, FIG. 4–2.
North, B., "Ceramic Cutting Tools," Carbide & Tool Journal, Sep./Oct. 1986, pp. 23–28.
"Experience Keeps Us Ahead," Feldmuhle Technical Products Group (1983) pp. 1–8.

(List continued on next page.)

Primary Examiner—Mark Rosenbaum
Assistant Examiner—John M. Husar
Attorney, Agent, or Firm—John J. Prizzi

[57] ABSTRACT

A ceramic cutting insert for high speed machining of materials is provided having an integral chip control surface thereon.

8 Claims, 2 Drawing Sheets

OTHER PUBLICATIONS

North, B., "Indexable Metalcutting Inserts-A Review of Recent Developments," Preprint, Materials in Machining, Nov. 8-10, 1988, Stratford-upon-Avon, England, The Institute of Metals, (1988) pp. 35.1-35.11.

North, B., "New Developments in Indexable Metalcutting Inserts," Proceedings of the International Machine Tool Research Forum, Sep. 1 and 2, 1987, Chicago, Illinois, pp. 11-1 to 11-24.

Mehrotra, P. K., "Hot Isostatic Pressing of Ceramic Metalcutting Tools," Metal Powder Report, vol. 42, No. 7/8, Jul./Aug. 1987, pp. 506, 508-510.

Smith, K. H., "Whisker Reinforced Ceramic Composite Cutting Tools," Carbide and Tool Journal, Sep./Oct. 1986, pp. 8, 10, 11.

Gruss, W. W., "Turning of Steel with Ceramic Cutting Tools," Tool Materials for HKH-Speed Machining, ASM International (1987) pp. 105-115, (see FIG. 11).

"American National Standard for Cutting Tools-Indexable Inserts-Identification System," ANSI B212.4-1986.

Evans and Charles, "Fracture Toughness Determination by Indentation," J. American Ceramic Society, vol. 59, No. 7-8, pp. 371-372, 1976.

"Properties and Proven Uses of Kennametal Hard Carbide Alloys," Kenna Metal Inc., 1977, p. 16.

"Advanced Cutting Tool Materials," Kennametal (1988) pp. 1-102.

"Ceramic Cutting Tool Materials," Sandvik Coromant Co. (1985) pp. 1-16.

"Ceramic Data & Usage for Valenite Ceramic Inserts," Valenite, Pub. No. DV-C-100, Oct. 1977, pp. 1-15.

Advertisements for Metal Cutting Systems, Inc., and Article-"How Does a Metal Want to be Cut?" American Machinist & Automated Manufacturing, Jul. 1987.

"Chip Control Inserts," Kennametal (1987) pp. 1-8.

Billman, E. R. et al, "Machining with $Al_2O_3$-SiC-Whisker Cutting Tools," Ceramic Bulletin, vol. 67, No. 6, 1988, pp. 1016-1019.

Buljan, S., et al. "Ceramic Whisker and Particulate-Composites: Properties Reliability and Applications," Ceramic Bulletin, vol. 68, No. 2 (1989) pp. 387-394.

CERAMIC CUTTING TOOL WITH CHIP CONTROL

BACKGROUND OF THE INVENTION

The present invention is a continuation-in-part of Ser. No. 07/629,760 filed Dec. 18, 1990, now U.S. Pat. No. 5,141,367 and relates to ceramic cutting tools having an integral chip control surface thereon. It especially relates to those ceramic cutting tools of the indexable type which are useful in the high speed machining of metallic materials.

Although ceramic cutting tools have demonstrated significant speed and/or tool life advantages in machining ferrous and non-ferrous materials in relation to cemented carbide, coated cemented carbide and cermet cutting tools in a number of applications, their usefulness remains limited by the commercial unavailability of inserts with positive rake molded chip control designs. Despite references to these designs in the literature (see U.S. Pat. Nos. 4,259,033; 4,340,324; 4,318,645; 4,087,193; 4,247,232), it is generally believed by those of ordinary skill in the art that such molded chip control designs in ceramic inserts will cause premature failure of the cutting edge during cutting operations. This belief is based on the lower transverse rupture strength and fracture toughness of ceramic cutting tool materials compared with cemented carbide and cermet cutting tools.

Compounds have been added to ceramics to increase their fracture toughness and transverse rupture strength. Such compounds, as silicon carbide whiskers, and titanium carbide, generally make the resulting composite more difficult to fabricate, insofar as a higher sintering temperature or hot pressing is required to achieve the full density needed to obtain the maximum fracture toughness and transverse rupture strength. It should be noted that, even when fully dense, the fracture toughness and transverse rupture strength of these ceramic composites are still well below those of cermets and cemented carbides.

These higher fabrication temperatures also lead to increased formation of a reaction layer at the surface of the ceramic composite. These reaction layers have a toughness and transverse rupture strength which is lower than that of the bulk material. Thus, in areas where it is critical to cutting performance that these surfaces have optimum strength and fracture toughness, these reaction layers have been ground off. These grinding requirements, therefore, make the fabrication of ceramic cutting inserts with chip control structures expensive and, where complex chip control structures are repaired, commercially impractical.

However, in most cases, in order to commercially and practically apply ceramic cutting inserts to the automatic (i.e., unmanned) high speed machining of ductile materials, such as soft carbon, alloy and stainless steels and ductile or malleable cast irons, which have a tendency to form undesirably long chips during high speed machining, some form of chip control is needed to provide the desired short chips.

In the past, a separate, nonintegral chipbreaker was clamped to the flat top rake face of ceramic inserts to provide a degree of chip control, where necessary (see "A Practical Guide to Carbide," PL Technical Services, Sidney, Ohio (1981) Pages 28–33). However, at low feeds, less than about 0.008 inches, most chipbreaker plates are difficult to properly position, resulting in poor chip control in soft steel machining.

Another attempted solution in the prior art was to provide in the top rake surface of the ceramic insert an integral rising chipbreaker structure (i.e., a shelf type chipbreaker). U.S. Pat. No. 4,616,963 shows such a prior art ceramic cutting insert. A bevel (T-land or K-land) is provided on the rake face adjacent the cutting edge. An island is provided on the rake face having a molded concave wall rising from and above the bevel. Both the bevel and flank face are in a ground condition. The advantage of this design is that it retains the strong cutting edge (i.e., the included angle formed by the bevel and the flank face at the cutting edge is greater than 90 degrees) of the ceramic inserts with a flat rake face, while in some limited conditions providing chip control. (Walter W. Gruss, "Turning of Steel with Ceramic Cutting Tools," Tool Materials for High-Speed Machining, ASM International (1987) Pages 105–115, see FIG. 11.) Unfortunately, this design and the separate top clamp design tend to crowd, or impede the flow of, the chip as it is formed, and it is thereby believed to increase the power required to cut while also increasing the stresses applied by the chip at or near the cutting edge, leading to reduced cutting edge lifetime. The grinding of the bevel and flank face are also costly operations.

Therefore, there has long been a need in the art for ceramic cutting inserts having a chip control structure, preferably in a positive rake design, and which can be economically and readily manufactured, while providing chip control and acceptable metalcutting lifetimes at high metalcutting speeds over a range of feeds and depths of cut.

SUMMARY OF THE INVENTION

Applicants have now discovered that both one-sided and two-sided ceramic cutting inserts which are useful in the high speed machining of soft steels and ductile irons can be produced and successfully used with an integral chip control structure on the rake face behind each cutting edge. In addition, applicants have also surprisingly discovered that, while these configurations may be produced and used in a ground condition, as molded flank faces and as molded positive rake chip control surfaces (e.g., lands and/or grooves) can also preferably be successfully made and utilized, thereby significantly reducing the manufacturing cost of such designs. Applicants have also discovered that these inserts can be preferably made with an aperture extending from the top surface to the bottom surface for receiving a locking means for securing the insert to a toolholder. The ceramic materials that are useful in this invention are those having a fracture toughness of at least 4 MPam$^{\frac{1}{2}}$. Surprisingly, it has been found that material having a fracture toughness of at least 4.0, and less than 5.0 MPam$^{\frac{1}{2}}$ are useful in the present invention. A fracture toughness of at least 4.5 MPam$^{\frac{1}{2}}$ is preferred. Preferably, the transverse rupture strength is at least 80 ksi, more preferably at least 100 ksi, and most preferably at least 130 ksi.

Preferably, these ceramic inserts are selected from the group of alumina based ceramics, silicon nitride based ceramics and sialon based ceramics. Preferably the ceramic composition has dispersed therein a reinforcing agent selected from the group of ceramic whiskers (e.g. titanium carbide and/or silicon carbide), ceramic particulate (e.g. zirconia, hafnia, silicon carbide and/or titanium carbide) and their mixtures. In addition the ceramic composition also preferably has a residue of a sintering aid dispersed therein. The sintering aid is preferably selected from the group of zirconia, yttria, magnesia and their mixtures with each other or with other elements. Applicants have found that a preferred ceramic composition comprises about 0.5 to less than 5 volume silicon carbide whiskers, 5–15 volume percent zirconia, and optionally a residue of a magnesia addition added in an amount of zero to 3 volume percent, all distributed in an alumina matrix. More preferably, this composition has 0.5 to 2.5 volume percent of silicon carbide whiskers, 7.5 to 12.5 volume percent of zirconia, with the residue of a magnesia addition added at a level of about 0.04 to 1 volume percent.

Preferably, the inserts according to the present invention may be used in the high speed machining of soft steels and ductile irons at a speed of 500 to 5,000 surface feet/minutes (sfm), a feed up to about 0.020 inches/revolution (ipr). Preferably, a feed of about 0.002 to 0.020 is utilized. Depending on the application and insert geometry, the depth of cut (DOC) may be as great as the length of the insert side, but usually is less than one-half that length, and is preferably less than 0.500, and more preferably, 0.015 to 0.500 inches.

These and other aspects of the present invention will become more apparent upon review of the following detailed specification in conjunction with the drawings which are briefly described below.

DETAILED DESCRIPTION OF THE INVENTION

The present invention may be utilized with a variety of indexable insert chip control designs, such as those shown in U.S. Pat. Nos. 4,318,645; 4,340,324; 4,247,232; 4,087,193; 4,056,871 and 3,383,748. However, applicants have found a particular design that provides the best performance in tests conducted thus far. This preferred design is shown in FIGS. 1 to 4. Samples of this style of indexable insert were manufactured and tested in the CNGM-432, CNGG-432, CNMG-432, CNMM-432, CNGG-442 and CNGM-442 styles (American National Standard Designation in accordance with ANSI B212.4-1986), as described later in the examples provided herein.

Figure 1:
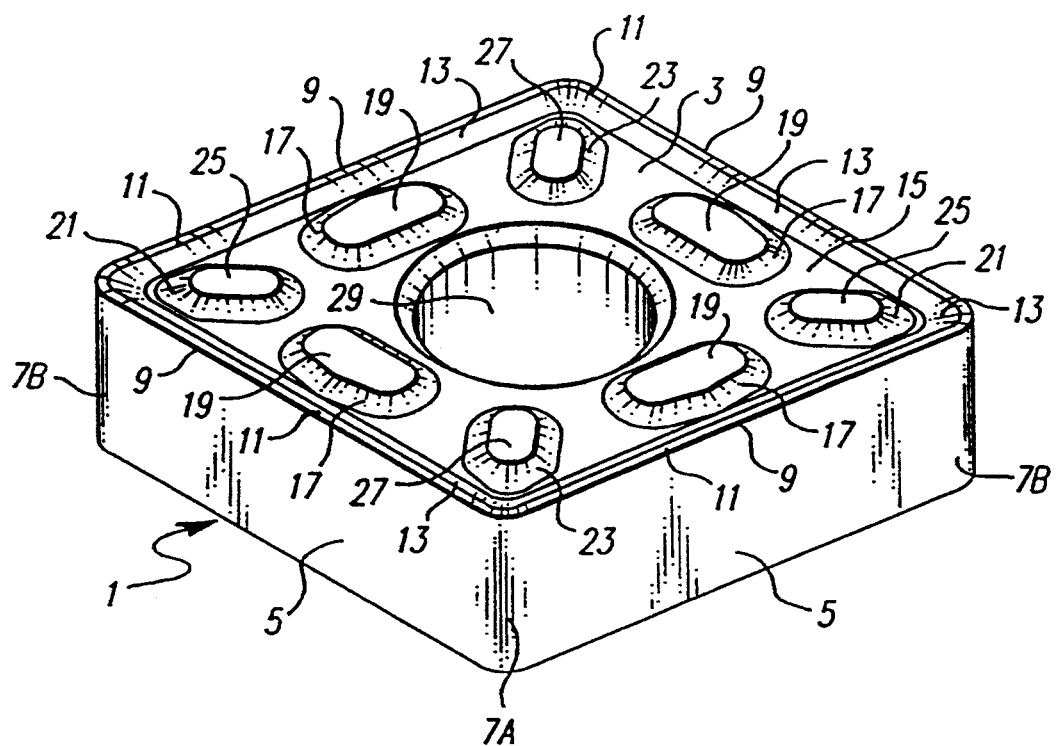
FIG. 1 shows an isometric view of a preferred embodiment of a ceramic indexable cutting insert in accordance with the present invention.

FIG. 1 shows an indexable, ceramic cutting insert 1 in accordance with the present invention. The cutting insert has a top rake face 3 and four flank faces 5, which are connected to each other at the rounded corner areas 7A and 7B of the insert 1. At the junction of the rake face 3 and the flank faces 5 are cutting edges 9. The cutting edges 9 are preferably in a honed condition. Adjacent cutting edges 9 are joined to each other in the corners 7A and 7B. Located on the rake face 3 are a number of as molded (i.e., as pressed and sintered) rake surfaces. Extending away from and adjacent to the cutting edge is a first rake surface, land 11, which preferably descends below a plane formed by the cutting edges as it extends away from its adjoining cutting edge. Following the land 11 is a second rake surface, descending wall 13, which is adjacent to the land 11 and extends inwardly and downwardly from the land 11 until it joins the third rake surface, floor 15, or a fourth rake surface, walls 17 of bumps 19. The floor 15 preferably is flat and lies in a plane parallel to the plane defined by the cutting edges 9. In the region of the insert corners 7A and 7B, the floor 15 is narrow and, at its inner edge, joins the rising walls 21 and 23 of bumps 25 and 27, respectively. The uppermost surface of bumps 19, 25 and 27 are preferably ground flat and coplanar with each other and parallel to the plane defined by the cutting edges. The bumps preferably extend above the cutting edges, especially in two-sided insert designs in order to avoid damaging the cutting edges on the bottom side of the insert when the insert is held in the pocket of a toolholder during metalcutting operations.

The floor 15 preferably extends inwardly to a hole 29 joining the top rake surface to the bottom of the insert or the bottom rake surface in the case of a two-sided insert. The hole 29 serves as a receptacle for receiving a locking means such as a pin or screw for locking the insert into the pocket of a toolholder during machining operations. Alternatively, the hole 29 may be replaced by a recess (not shown) for receiving a clamp. Examples of such designs are shown in U.S. Pat. No. 4,480,950.

Figure 2:
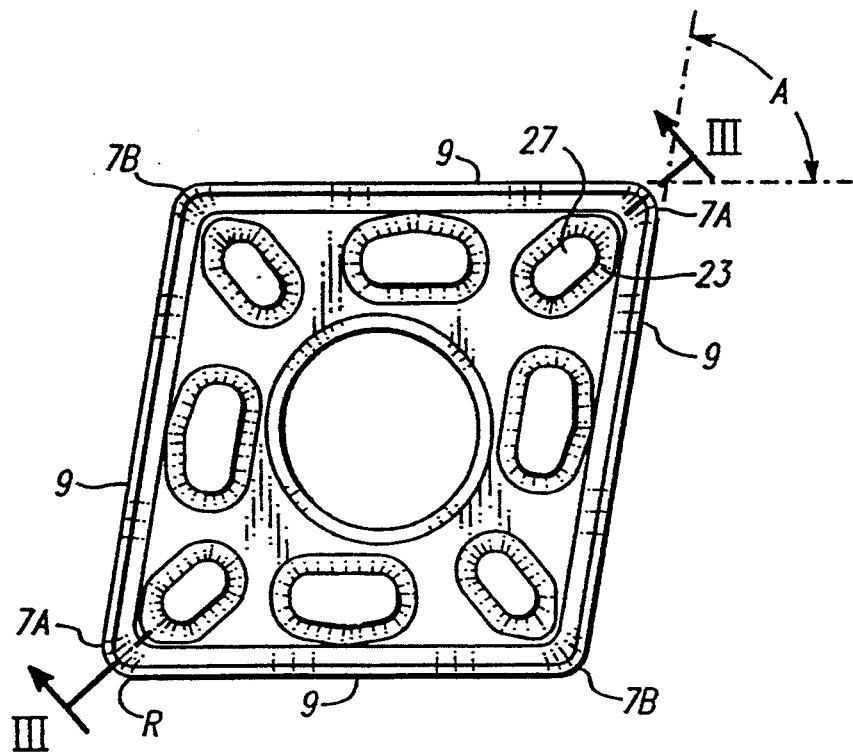
FIG. 2 shows a top view of the cutting insert shown in FIG. 1.

In the top plan view shown in FIG. 2, it can be seen that the insert is preferably in the shape of a diamond having rounded corners 7A and 7B. The cutting edges in the areas of corners 7A, having the smaller included angle A, which is preferably about 80 degrees, were utilized in the examples which follow. This shape insert is commonly referred to as an 80 degree diamond.

Figure 3:
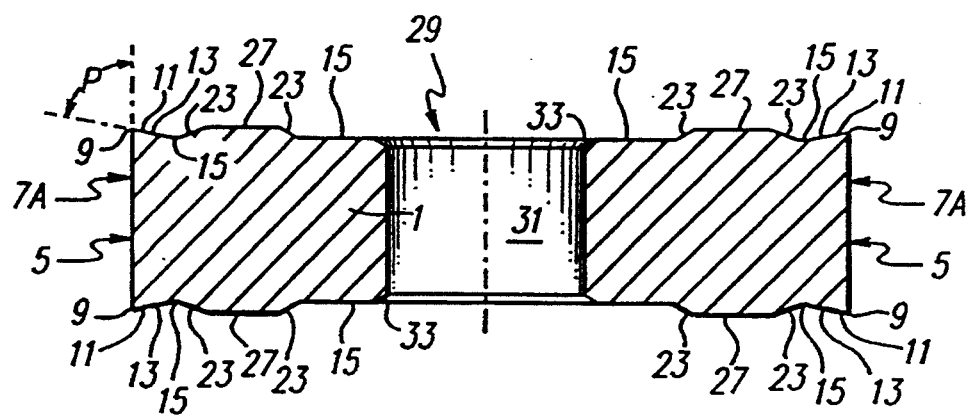
FIG. 3 shows a cross section of the insert shown in FIGS. 1 and 2 viewed along section III—III in FIG. 2.

FIG. 3, which is a cross section along the bisector of angles A in corners 7A, shows more clearly that the preferred embodiment is a two-sided insert having cutting edges 9 and bumps on both rake faces 3. The insert is a positive rake insert in that the included angle, P, formed by the flank face 5 and rake surface, land 11, at the cutting edge 9 is less than 90 degrees. Together, descending wall 13, floor 15 and bump wall 23 form a chip control groove surface or structure which is in an as molded condition (i.e., not ground). The bumps 27 shown in cross section have walls 23 whose slopes vary. The slope is shallowest on the side of the bump closest to the corner and gradually increases as one moves away to either side of the plane bisecting the corner angle such that for most of the way around bumps 27 the slope is a constant 30 degrees.

Figure 4:
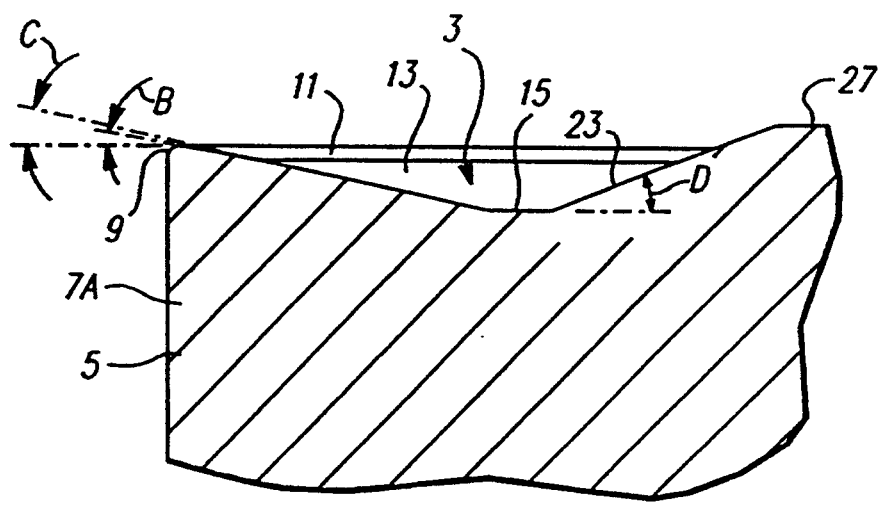
FIG. 4 shows an enlarged cross section of a cutting edge and chipbreaker structure shown in FIG. 3.

FIG. 4 is an enlarged view of one of the corner areas 7A shown in the cross section in FIG. 3. It can now be seen that the cutting edge 9 formed at the junction of the flank face 5 and the rake face 3 is in a honed (e.g., radius hone) condition. The first rake surface, land 11, preferably extends inwardly about 0.010 inch from the flank face and downwardly away from the plane defined by the cutting edges 9, preferably at an angle, B, of about 9 to 11 degrees, and more preferably, of about 10 degrees with respect to the plane defined by the cutting edges. The second rake surface, descending wall 13, preferably extends inwardly and downwardly from its junction with the land 11 at an angle C, that is greater than angle B. Preferably, in the rounded corners 7A, descending wall 13 extends inwardly from its junction with land 11 about 0.030 inch and angle C is about 11 to 13 degrees, and more preferably, about 12 degrees.

Preferably, in the rounded corners 7B, descending wall 13 extends inwardly from its junction with land 11 about 0.025 inch and angle C is about 13 to 15 degrees, and more preferably, about 14 degrees. As one moves away from the bisectors of the corner angles, angle C increases from the values mentioned above to a value of about 17 to 19 degrees, which is preferably constant along the straight portions of the cutting edges 9. Along the straight portions of the cutting edges, descending wall 13 extends inwardly from its junction with the land about 0.019 inch.

Returning now to FIG. 4, it can be seen that, along its inner edge, descending wall 13 joins the third rake surface, floor 15. Floor 15 extends inwardly about 0.005 to 0.008 inch to a fourth rake surface, wall 23 of bump 27. Wall 23 typically rises at an angle, D, of 30 degrees, but in the region of the corner 7A, angle D is about 20 degrees. In corner 7B, angle D is about 24 degrees. As one, however, moves around the bumps in the corner region away from the corner, the angle, D, gradually increases to 30 degrees.

The height of the bumps 27, 25 and 19 above the plane defined by the cutting edge is preferably about 0.001 to 0.005 inch. The plane defined by the cutting edges is preferably about 0.007 to 0.009 inch above the plane of the floor 15. As can be seen in FIG. 3, floor 15 extends inwardly toward hole 29 in the center of the rake surface 5, and is joined to the cylindrical wall 31 of hole 29 by a beveled surface 33 which is inclined to the plane of the floor at an angle of 30 degrees and extends inwardly about 0.02 inches. The hole has a diameter of about 0.202 to 0.206 inch. While the cylindrical wall 31 of the hole may be in an as molded or ground condition, it is preferably in an as molded condition to reduce fabrication costs.

Alternatively, where a stronger edge geometry is needed, angle P may be 90 degrees or greater, up to 125 degrees. An one sided insert may also preferably be used where higher edge strength is required.

Preferred nominal ceramic compositions which have been tested with the present invention are shown in Table I, along with their fracture toughness ($K_{IC}$(E&C)) and transverse rupture strength (TRS).

TABLE I

| | Nominal Composition (Volume Percent) | |
|---|---|---|
| | I | II |
| $SiC_w$ | 1.5 | 2.5 |
| $ZrO_2$ | 10 | 10 |
| MgO | .55 | .55 |
| $Al_2O_3$ | Essentially Remainder except for impurities | |
| | Properties | |
| $K_{IC}$(E&C)[1] | 5.0–5.3 MPam½ | 5.1–5.6 MPam½ |
| TRS[2] | 147 ksi | 136 ksi |

[1]Evans and Charles indentation method using an 18.5 kilogram load with a Vicker's indentor.
[2]Three point test with a 9/16 inch distance between supports using a 0.2 inch × 0.2 inch × 0.75 inch size specimen ground all over (see "Properties and Proven Uses of Kennametal Hard Carbide Alloys," Kennametal Inc., 1977, Page 16).

These and similar compositions are described and protected by U.S. Pat. Nos. 4,959,331 and 4,959,332.

The present invention will be further clarified by the following examples which are intended to be purely exemplary of the present invention.

Compositions containing $Al_2O_3$—10 volume percent $ZrO_2$—0.55 volume percent MgO and either 1.5 or 2.5 volume percent SiC whiskers were made. A batch of each composition was prepared by first blending $Al_2O_3$ (Ceralox Grade HPA-0.5 with MgO (0.05 weight percent)), $ZrO_2$ (Magnesium Elektron SC15) and MgO (Fisher Reagent Grade) slurry (propanol) in a ball mill with $Al_2O_3$ cycloids for at least 20 hours to obtain a mean particle size of about 0.5 to 0.6 µm and a minimum specific surface area measured by BET of 12 m²/gm. A sonicated SiC whisker (Tokai Grade 1) slurry was then added and the components were then blended for one hour. The resultant blend was pan dried, screened through a 100 mesh screen, and granulated by the fluidized bed method.

Indexable ceramic cutting inserts in accordance with the present invention were then pill pressed from the foregoing granulated powder batches. The pill pressing operation produces a low density green compact having the desired chipbreaker geometry molded into the rake face(s). These green compacts may optionally then be isostatically compacted (e.g., at 30,000 psi) at room temperature to further improve green density. The green compacts were then sintered at 1600 degrees Centigrade (1.5 v/o SiC) or at 1625 degrees Centigrade (2.5 v/o SIC). The inserts were placed in graphite pots, on a bed of NbC setting powder, and sintered for one hour. The density of the inserts was then further increased to almost one hundred percent of theoretical by HIPping the inserts in a helium atmosphere at 20,000 psi for one hour at temperatures of 1550 degrees Centigrade or 1600 degrees Centigrade for the 1.5 volume percent silicon carbide whiskers and the 2.5 volume percent silicon carbide whisker compositions, respectively.

The insert geometries produced by the above methods are listed and described below.
1. CNGM-432
2. CNGG-442
3. CNGM-442

Each of the above inserts is one sided except for No. 2, which is two sided and is shown in FIGS. 1–4. All of the above inserts were made by pill pressing followed by cold isostatic pressing. Isostatic pressing was performed at 30,000 psi. Insert Nos. 1–3 have about a 0.002 to 0.003 inch radius hone on their cutting edges. Insert Nos. 1, 2 and 3 have had their flank faces ground and the top and bottom seating surfaces on their rake faces ground.

Each of the above inserts was subjected to a machining test as shown below in Table II. As can be seen in Table II, the ceramic cutting inserts in accordance with the present invention (Nos. 1–3) provided significantly increased lifetimes over cermet inserts (Nos. 4 and 5) having a similar chip control design with a 0.001 to 0.002 inch radius hone on their cutting edges. In addition, these increased lifetimes were achieved while maintaining the chip control provided by cermets and cemented carbide cutting inserts.

TABLE II

| TURNING OF AISI 1045 STEEL (200 BHN HARDNESS) | | |
|---|---|---|
| | Cutting Edge Lifetime and Failure Mode Composition | |
| Insert Style | 1.5 v/o SiCw | 2.5 v/o SiCw |

TABLE II-continued

| | | | | | | |
|---|---|---|---|---|---|---|
| 1. CNGM-432 | 12.5 FW | 12.0 FW, DN | | 10 FW | 4 | DN, CK-TE |
| 2. CNGG-442 | 5.3 DN | 12.0 FW | | 10 FW | 9.5 | FW |
| 3. CNGM-442 | 6.3 DN | 12.0 FW | | 6 DN, CH | 9.5 | FW |
| 4. CNMG-432 | 2.1 NW-TD | 2.3 NW | | | | |
| 5. CNMG-432 | 1.5 BK | 2.5 FW, NW | | | | |

| Machining Test Conditions: | |
|---|---|
| Speed: | 1500 sfm |
| Feed: | 0.010 ipr |
| Doc: | 0.100 inch |
| Lead Angle: | −5 degrees |
| Coolant: | Dry |

End of Life Criteria
DN = Depth of Cut Notching .030 inch max.
FW = Uniform Flank Wear .015 inch max.
CH = Chipping .030 inch max.
CK-TE = Cracking on Trailing Edge (End Cutting Edge)
NW = Nose Wear .030 inch max.
NW-TD = Nose Wear-Thermal Deformation .030 inch max.
BK = Breakage Additional inserts were made by the techniques described above without the use of the isostatic pressing step. These ceramic inserts were composed of the ceramic composition containing 1.5 volume percent SiC whiskers, also described above. The styles of inserts produced are shown below in Table III. Inserts 6 and 7 were double-sided, whereas inserts 8 and 9 were single-sided. The double-sided inserts were top and bottom ground (tops of the bumps only), whereas the single-sided inserts were only bottom ground to assure a flat seating surface(s). Only inserts 6 and 8 had their flank surfaces ground, whereas the flank surfaces of inserts 7 and 9 were left in the as molded condition. The cutting edge of each of these inserts were provided with a 0.003 inch radius hone.

TABLE III

TURNING OF AISI 1045 STEEL (200 BHN)

| INSERT STYLE | CUTTING EDGE LIFETIME (MINUTES) & FAILURE MODE | |
|---|---|---|
| 6. CNGG-432 | 24 BK | |
| 7. CNMG-432 | >30 | >30 |
| 8. CNGM-432 | 16 CK | 26 FW |
| 9. CNMM-432 | 21 FW | 16 FW |
| 10. CNMG-432 | 14.5 NW | |

| MACHINING TEST CONDITIONS | |
|---|---|
| SPEED: | 1000 sfm |
| FEED: | 0.008 ipr |
| DOC: | 0.100 inch |
| LEAD ANGLE | −5 degrees |
| COOLANT: | Dry |

Insert 10 in Table III was used for comparison purposes and was a double-sided, KC990 insert, having the same chip control structure as the ceramic inserts 6 through 9. The cutting edges of this insert had a 0.001 to 0.002 radius hone. KC990 is a trademark of Kennametal Inc. for its coated cemented carbide cutting inserts having a multilayer alumina coating.

The machining test results shown in Table III show that, under the conditions tested, the ceramic inserts according to the present invention (Inserts 6–9), are capable of providing improved cutting edge lifetimes over a coated cemented carbide insert (insert 10) while also having the same chip control structure as the cemented carbide insert. The ceramic inserts according to the present invention provided excellent chip control under these conditions. Flat ceramic inserts of the same composition having a T-land but without either an integral or nonintegral chipbreaker produced unacceptable long continuous chips under these conditions. These test results also demonstrate that isostatic pressing of the pill pressed insert, and grinding of peripheral surfaces (flank surfaces) are not necessary to the achievement of the benefits of the present invention under these test conditions.

Samples from additional heats made from the 1.5 v/o SiCwmix described above, as well as samples from heats made from a second mix having the same nominal composition, were made as described above utilizing a sintering temperature of 1575 to 1600 degress Centigrade. It was found that the fracture toughness of these heats ranged from 4.7 to 5.5 and 4.1 to 5.2 MPam$^{\frac{1}{2}}$ for the first and second mix, respectively.

The transverse rupture strength of the foregoing 1.5 v/o SiCw mixes ranged from about 139 to 147 ksi (1575° C. sinter) when the samples were tested in the as ground condition (i.e., without the reaction layer). By way of example, a sample was tested with its reaction layer in place, and it was found that the TRS of that sample was only about 75 ksi. This clearly demonstrates the adverse effect of reaction layers on TRS, but as shown here, despite these reaction layers, ceramic inserts with as molded chipbreaker and other surfaces are capable of providing acceptable metalcutting performance.

The following examples are provided to show that excellent metalcutting performance can also surprisingly be achieved in ceramic inserts with molded chipbreakers having a fracture toughness of less than 5.0 MPam$^{\frac{1}{2}}$.

A composition containing $Al_2O_3$—10 volume percent $ZrO_2$—0.55 volume percent MgO and 1.5 volume percent SiC whiskers was made. A batch was prepared by first blending an $Al_2O_3$ (Ceralox Grade HPA-0.5 with MgO (0.55 weight percent)) and $ZrO_2$ (Magnesium Elektron SC15) slurry (water) in a ball mill with high purity $Al_2O_3$-$ZrO_2$ cycloids for at least 20 hours to obtain a mean particle size of about 0.5 to 0.6 μm and a minimum specific surface area measured by BET of 12 m$^2$/gm. A sonicated SiC whisker (Tokai Grade 1) slurry was then added and the components were then blended for one hour. A binder and plastizer were added. The binder was AIRVOL -523, a polyvinyl alcohol, made by Air Products Corp. of Allentown, Pa., and the plastizer was Carbowax (polyethyleneglycol), made by Union Carbide. The resultant blend was then spray dried.

Indexable ceramic cutting inserts in accordance with the present invention were then pill pressed from the spray dried powder batch. The green compacts were then sintered at 1650 degrees Centigrade. The inserts were placed in graphite pots, on a bed of NbC setting powder, and sintered for one hour. The density of the inserts was then further increased to almost one hundred percent of theoretical by HIPping the inserts in a helium atmosphere at 20,000 psi for one hour at a temperature of 1550 degrees Centigrade. The resultant ceramic material had fracture toughness of 4.8 MPam-$^{\frac{1}{2}}$ and about 2.4 v/o monoclinic and about 7.6 v/o tetragonal zirconia.

The insert geometries produced were:
11. SNMG-432 (2 sided)
12. SNMM-432 (1 sided)

These inserts have a chipbreaker structure like that shown in FIGS. 1-4, but on a square insert.

Insert Nos. 11 and 12 have about a 0.002 to 0.003 inch radius hone on their cutting edges and have had their top and bottom seating surfaces on their rake faces ground. The hole and the flank surfaces were left in an as molded condition.

Each of the above inserts was subjected to a machining test as shown below in Table IV. As can be seen in Table IV, these ceramic cutting inserts provided excellent lifetimes. In addition, these lifetimes were achieved while providing excellent chip control.

TABLE IV

| TURNING OF AISI 1045 STEEL (200 BHN HARDNESS) | | |
|---|---|---|
| Insert Style | Cutting Edge Lifetime and Failure Mode | |
| 11. SNMG-432 | 18 minutes | BK |
| 12. SNMM-432 | >30 minutes | |
| Machining Test Conditions: | | |
| Speed: | 1000 sfm | |
| Feed: | 0.010 ipr | |
| Doc: | 0.15 inch | |
| Lead Angle: | +15 degrees | |
| Coolant: | Dry | |

Additional tests have shown that the insert geometry described above provides best chip control at feeds of about 0.008 to 0.020 inches. Below about 0.008 inch feed, an insert in a MG-UF or MP-K chip control geometry provide better chip control. Examples of the MG-UF and MG-K geometries are shown in "Kennametal Tooling Applications Program-Turning Applications Workbook" (Catalogue No. A90-46(30)HO(1990)) Page 52. U.S. Design Pat. No. 305,662 shows examples of the MG-UF geometry.

In alternative embodiments, the cutting inserts may be coated with a refractory coating, for example by chemical vapor deposition (CVD) or physical vapor deposition (PVD) techniques. (See, for example, U.S. Pat. No. 4,801,510, related to CVD $Al_2O_3$, TiN and TiCN coating of ceramics, and P. C. Jindal and D. T. Quinto, United States patent application Ser. No. 490,856, filed Mar. 9, 1990, and assigned to Kennametal Inc., relating to PVD TiN coating of ceramics.)

The patents and other documents referred to herein are hereby incorporated by reference.

Other embodiments of the invention will be apparent to those skilled in the art from a consideration of this specification or the practice of the invention disclosed herein. It is intended that the specification and examples be considered as exemplary only, with the true scope and spirit of the invention being indicated by the following claims.

What is claimed is:

1. A ceramic cutting insert for high speed machining comprising:
   a cutting edge,
   a rake face with a chip control groove surface,
   a flank face,
   and wherein said cutting edge is formed at the juncture of said flank face and said rake face;
   said ceramic insert comprising 0.5 to less than 5 volume percent silicon carbide whiskers, 5 to 15 volume percent zirconia, a residue of a magnesia addition added in an amount of zero to 3 volume percent, all dispersed in an alumina matrix;
   and wherein said ceramic insert has a fracture toughness of at least 4.0 MPam$^{\frac{1}{2}}$.

2. The insert according to claim 1 wherein said flank face is in as molded condition.

3. The insert according to claim 2 wherein said chip control groove surface is in an as molded condition.

4. The insert according to claim 1 wherein said chip control groove surface is in an as molded condition.

5. The insert according to claim 1 wherein said silicon carbide whiskers are present at a level of 0.5 to 2.5 volume percent and said zirconia is present at a level of 7.5 to 12.5 volume percent.

6. The insert according to claim 5 wherein said magnesia addition is added in an amount of about 0.04 to 1 volume percent.

7. The insert according to claim 1 wherein said fracture toughness is 4.0 MPam$^{\frac{1}{2}}$ to less than 5.0 MPam$^{\frac{1}{2}}$.

8. The insert according to claim 1 further comprising means extending through the rake face and the thickness of the ceramic insert for receiving a locking means for holding said ceramic insert on a toolholder.

* * * * *

UNITED STATES PATENT AND TRADEMARK OFFICE
CERTIFICATE OF CORRECTION

PATENT NO. : 5,350,258

DATED : September 27, 1994

INVENTOR(S) : Craig W. Beeghly, Deepak P. Ahuja, Pankaj K. Mehrotra, and Kenneth L. Niebauer It is certified that error appears in the above-identified patent and that said Letters Patent is hereby corrected as shown below:

Column 1, line 54, cancel "repaired" and substitute -- required --.
Column 7, Table II, insert a line between item 3. and item 4.
Column 7, Table III, insert -- <u>END OF LIFE CRITERIA:</u> (See Table II) -- after Table.
Column 9, line 7, cancel "MPam-" and substitute -- $MPam^{\frac{1}{2}}$ --.
Column 9, line 8, cancel "½".
Column 9, Table IV, insert -- <u>End of Life Criteria:</u> (See Table II) -- after the Table.

Signed and Sealed this

Twenty-eight Day of March, 1995

Attest:

BRUCE LEHMAN

*Attesting Officer*     *Commissioner of Patents and Trademarks*